(12) United States Patent
Beev et al.

(10) Patent No.: US 12,066,163 B2
(45) Date of Patent: Aug. 20, 2024

(54) LIGHTING MODULE FOR LATERAL PART OF A VEHICLE

(71) Applicant: VALEO VISION, Bobigny (FR)

(72) Inventors: Kostadin Beev, Bobigny (FR); Jean Luc Meyrenaud, Bobigny (FR); Jingjing Xue, Bobigny (FR); Stephane Andre, Bobigny (FR); Marie Pellarin, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 17/776,981

(22) PCT Filed: Nov. 13, 2020

(86) PCT No.: PCT/EP2020/082121
§ 371 (c)(1),
(2) Date: May 13, 2022

(87) PCT Pub. No.: WO2021/094574
PCT Pub. Date: May 20, 2021

(65) Prior Publication Data
US 2022/0390083 A1    Dec. 8, 2022

(30) Foreign Application Priority Data

Nov. 15, 2019  (FR) ..................................... 1912758
Dec. 16, 2019  (FR) ..................................... 1914549

(51) Int. Cl.
*F21S 43/14*    (2018.01)
*B60Q 1/24*     (2006.01)
(Continued)

(52) U.S. Cl.
CPC .............. *F21S 43/14* (2018.01); *B60Q 1/249* (2022.05); *B60R 1/1207* (2013.01); *F21S 43/26* (2018.01); *B60R 2001/1253* (2013.01)

(58) Field of Classification Search
CPC .......... F21S 43/14; F21S 43/26; B60Q 1/249; B60R 1/1207
See application file for complete search history.

(56) References Cited

U.S. PATENT DOCUMENTS 4,964,021 A    10/1990  Masin
6,347,880 B1   2/2002   Furst et al.
(Continued)

FOREIGN PATENT DOCUMENTS

CN    201599722 U    10/2010
CN    201875628 U    6/2011
(Continued)

OTHER PUBLICATIONS

International Search Report mailed on Feb. 16, 2021 in PCT/EP2020/082121 filed on Nov. 13, 2020 (4 pages).

*Primary Examiner* — Christopher E Dunay
(74) *Attorney, Agent, or Firm* — Oblon, McClelland, Maier & Neustadt, L.L.P.

(57) ABSTRACT

A lighting module for a vehicle includes a light source and a lens including an input dioptre oriented towards the light source and an output dioptre. The output dioptre includes at least one section through a horizontal plane having two convex portions separated by a concave portion, viewed from a side opposite the light source. The input dioptre includes a section through a vertical median plane having a lower convex portion and an upper concave portion, viewed from a side opposite the light source.

19 Claims, 6 Drawing Sheets

(51) Int. Cl.
    *B60R 1/12*        (2006.01)
    *F21S 43/20*       (2018.01)

(56)            References Cited

U.S. PATENT DOCUMENTS

| | | |
|---|---|---|
| 8,840,270 B2 | 9/2014 | Schwalenberg et al. |
| 2002/0041498 A1 | 4/2002 | Furst et al. |
| 2006/0239020 A1* | 10/2006 | Albou .................. B60Q 1/26 362/520 |
| 2007/0029563 A1 | 2/2007 | Amano et al. |
| 2011/0235338 A1 | 9/2011 | Chen et al. |
| 2011/0320024 A1 | 12/2011 | Lin et al. |
| 2012/0229645 A1 | 9/2012 | Yamada |
| 2014/0092616 A1* | 4/2014 | Motomura ............. F21S 43/26 362/520 |
| 2014/0268855 A1* | 9/2014 | Gerardo ................ F21S 43/19 362/520 |
| 2016/0273729 A1* | 9/2016 | Albou .................. F21S 41/26 |
| 2017/0254499 A1* | 9/2017 | Jin ........................ F21S 45/10 |
| 2018/0050820 A1* | 2/2018 | Jha ....................... F21S 43/26 |
| 2018/0172238 A1 | 6/2018 | Camras |
| 2019/0170325 A1* | 6/2019 | Lai ....................... F21S 43/40 |
| 2019/0271451 A1 | 9/2019 | Camras |
| 2020/0248887 A1 | 8/2020 | Camras |

FOREIGN PATENT DOCUMENTS

| | | |
|---|---|---|
| CN | 202613315 U | 12/2012 |
| CN | 107228338 A | 10/2017 |
| DE | 10 2015 009 875 A1 | 3/2016 |
| DE | 10 2017 007 761 A1 | 1/2018 |
| DE | 10 2018 201 043 A1 | 7/2019 |
| EP | 0 945 306 A1 | 9/1999 |
| EP | 2 935 982 A1 | 10/2015 |
| FR | 2 614 969 A1 | 11/1988 |
| FR | 2 639 294 A1 | 5/1990 |
| WO | WO 2019/150011 A1 | 8/2019 |

\* cited by examiner

LIGHTING MODULE FOR LATERAL PART OF A VEHICLE

The invention relates to a lighting module for illuminating lateral areas of a vehicle. It also relates to an assistance device and to a vehicle as such comprising at least one such lighting module. The invention lastly relates to a method for assisting with the driving of a motor vehicle using at least one such lighting module.

With the development of autonomous motor vehicles, it is becoming necessary to improve driving assistance in all lighting conditions, especially with a view to managing various specific driving functions, including:
- "lane keeping", which function allows a vehicle to follow its lane on a road, especially by detecting any deviation in path and signaling it to the driver;
- "lane centering", which function complements the preceding function, and more specifically allows the vehicle to be kept in the center of its lane autonomously,
- "lane changing", which function allows a vehicle to change lane, for example with a view to overtaking,
- "autonomous emergency braking" (or more simply AEB),
- "autonomous emergency steering" (or more simply AES), which function makes it possible to avoid an obstacle present in the vehicle's lane,
- "parking assistance", and "autonomous parking".

In these various functions, the assisting device needs to receive input information, in particular including information regarding the detection of ground markings, such as the lines bounding the lanes, and/or the presence of any obstacles on the road. This detection must be able to be carried out in all conditions, and especially at night.

It will be noted that existing vehicle lighting allows the road in front of the vehicle to be illuminated from a distance of two meters in the vehicle's own lane, and five meters in adjacent lanes.

However, illuminating the lateral area of the vehicle is more awkward because the illumination must cover the entirety of a rectangular area adjacent to the vehicle, extending from a few centimeters to several meters from the vehicle and over a length of about ten meters. The angular extent of this area to be illuminated makes it very difficult to illuminate this entire area uniformly. Additionally, dazzling adjacent vehicles is of course prohibited.

These constraints mean that, at the present time, it is awkward, if not impossible, to be able to detect certain ground markings or obstacles close to a vehicle, in particular in the lateral regions, this preventing provision of an assisting device able to perform the aforementioned functions, which are required by autonomous vehicles.

In addition, the outline of a vehicle is also very important both for its esthetics and its aerodynamics. The lighting modules of a motor vehicle must not modify its external outline. They must therefore be compact in order to be able to integrate them discreetly and esthetically into a motor vehicle.

The aim of the invention is to provide a solution for illuminating a lateral region of a vehicle that remedies the above drawbacks and improves the devices and methods for assisting with driving a motor vehicle, especially allowing it to perform the aforementioned assistance functions, so as to make it suitable for assisting an autonomous vehicle.

In addition, the aim of the invention is to provide a solution for illumination of and assistance with the driving of a motor vehicle that is simple, reliable and offers good illumination performance while not generating excessive extra costs.

To that end, the invention relates to a lighting module for a vehicle, comprising a light source and a lens comprising an entry diopter oriented toward the light source and an exit diopter, characterized in that the exit diopter comprises at least one section through a horizontal plane comprising two convex portions separated by a concave portion, when viewed from a side opposite the light source, and in that the entry diopter comprises a section through a vertical median plane having a convex lower portion and a concave upper portion when viewed from a side opposite the light source.

Said convex portions and concave portion of said section of the exit diopter through a horizontal plane may have a rounded shape, in particular in the form of a portion of a circle, and/or a succession of linear portions, in particular two rounded convex portions separated by a concave portion forming an acute angle or having a small radius of curvature, and/or said convex portions and concave portion of said section of the entry diopter through a vertical median plane may have a rounded shape, in particular in the form of a portion of a circle, and/or a succession of linear portions.

The entry diopter may comprise at least one section through a horizontal plane in the form of a portion of a circle centered on the light source or the surface of the entry diopter may be formed by the rotation of said section through a vertical median plane about a vertical axis of rotation passing through the light source.

The exit diopter may comprise a section through a vertical median plane having a shape at least partially in the form of a portion of a circle centered on the light source, or may comprise multiple sections through vertical planes comprising the light source having a shape at least partially in the form of a portion of a circle centered on the light source.

All the sections through a horizontal plane of the exit diopter may have two convex portions separated by a concave portion or the horizontal sections of the exit diopter may have two convex portions separated by a concave portion over at least half or at least three quarters of the height of the lens.

The surface of the exit diopter may extend in at least one vertical plane in a rounded manner, or even in the form of a portion of a circle, as far as a lower end substantially positioned in a longitudinal vertical plane passing through the light source, and/or the surface of the exit diopter may extend in at least one horizontal plane as far as one or two ends substantially positioned in a longitudinal vertical plane passing through the light source.

The lens may comprise a reflective upper surface for reflecting the light rays coming from the light source into the lens.

The lighting module may have a shape distributed symmetrically about a vertical median plane.

The lighting module may have a length less than or equal to 50 mm, or even less than or equal to 45 mm, and/or may have a width less than or equal to 15 mm, or even less than or equal to 13 mm, and/or may have a height less than or equal to 20 mm, or even less than or equal to 15 mm.

The lighting module may comprise a first screen positioned on a first side of the light source, a second screen positioned on a second side of the light source, the second side being opposite the first side with respect to the light source, the first screen being intended to extend substantially parallel to a vertical and transverse plane, in front of the light source and at the height of the light source, the second screen being intended to extend substantially parallel to a vertical and transverse plane, behind the light source and at the height of the light source, the first screen comprising a reflective surface for reflecting light rays coming from the light source toward the second side of said lateral area and/or the second screen comprising a reflective surface for reflecting light rays coming from the light source toward the first side of said lateral area.

The lighting module may comprise a third screen extending between the first screen and the second screen, the third screen being intended to extend substantially horizontally and above the light source.

The first screen may extend generally in a first plane and the second screen may extend generally in a second plane, the first plane and the second plane forming a non-zero angle, in particular an angle of between 0° and 50°.

The first screen and the second screen may be obtained by plastics injection molding.

The reflective surface of the first screen and/or the reflective surface of the second screen may be obtained by metal deposition, in particular by aluminization.

The reflective surface of the first screen and/or the reflective surface of the second screen may comprise one or more reliefs.

The invention also relates to a lateral rear-view mirror for a motor vehicle, characterized in that it comprises a lighting module as described above, the lateral rear-view mirror comprising an observation mirror or a camera so as to allow a driver to view the area behind a motor vehicle, the lighting module being positioned vertically below the observation mirror or below the camera.

The lateral rear-view mirror may comprise a casing supporting the observation mirror, the length of the casing being greater than or equal to the length of the lighting module and/or the width of the casing being greater than or equal to the width of the lighting module.

The casing can support an observation mirror, the casing forming a one-piece assembly with the first screen and/or with the second screen.

The invention also relates to a driving assistance device, characterized in that it comprises at least one lighting module as described above and/or a lateral rear-view mirror as described above in order to illuminate the lateral area of a motor vehicle, in that it comprises at least one camera for viewing said illuminated lateral area, and in that it further comprises a central unit comprising a hardware and/or software device utilizing the data transmitted by said at least one camera to calculate driving assistance data and transmit them to a vehicle.

The invention also relates to a motor vehicle, in particular an autonomous or semi-autonomous motor vehicle, characterized in that it comprises one or more lighting modules as described above, arranged in the bottom and lateral part of the motor vehicle or at a rear-view mirror of the vehicle or in that it comprises a driving assistance device as described above.

The invention also relates to a method for assisting with the driving of a motor vehicle, characterized in that it comprises the following steps:

Illuminating a lateral area of a vehicle using at least one lighting module as described above, arranged in the lateral part of the motor vehicle;

Viewing said illuminated lateral area using at least one camera arranged on the motor vehicle, and transmitting the data viewed by the camera to a central unit of the motor vehicle;

Analyzing said data received by the central unit, in particular detecting obstacles, and deducing driving assistance instructions;

Transmitting driving assistance data to an autonomous driving device and/or to a man-machine interface of the motor vehicle.

These objects, features and advantages of the present invention will be explained in detail in the following description of one particular embodiment provided without limitation with reference to the accompanying figures, in which.

By convention, the three directions x, y, z will be used in the following text first and foremost as a frame of reference for a lighting module in isolation. The direction y will be referred to as longitudinal direction, and corresponds to the direction along the greatest length of the lighting module, the direction x as the transverse direction, and the direction z as the vertical direction. These directions are chosen in relation to the particular geometry of the lighting module, which will be described below. These directions are also chosen in addition with reference to a vehicle on which the lighting module is able to be positioned, on a lateral flank, in order to proceed with the illumination of the lateral area of said motor vehicle, this vehicle itself being positioned on a horizontal plane. In a particular example of implementation, the longitudinal direction y of the lighting module corresponds to the direction oriented from the rear to the front of the motor vehicle, thus the longitudinal direction of the vehicle. Furthermore, the direction x corresponds to the direction oriented from the left to the right of the vehicle.

Lastly, the direction z corresponds to the vertical direction. In summary, the directions x, y, z are thus also defined in an extended manner with respect to a motor vehicle, in a configuration of specific alignment of the lighting module with the vehicle. The adjectives "upper" or "top" and "lower" or "bottom" will be used with reference to the vertical direction defined above. The adjectives "lower" or "bottom" will thus refer to elements positioned or intended to be positioned by a ground to be illuminated.

Additionally, the adjectives "convex" and "concave" will be used by convention to describe the optical elements of the invention from a position outside a motor vehicle, opposite the side on which a light source is intended to be positioned relative to said optical elements so as to interact with them.

Figure 1:
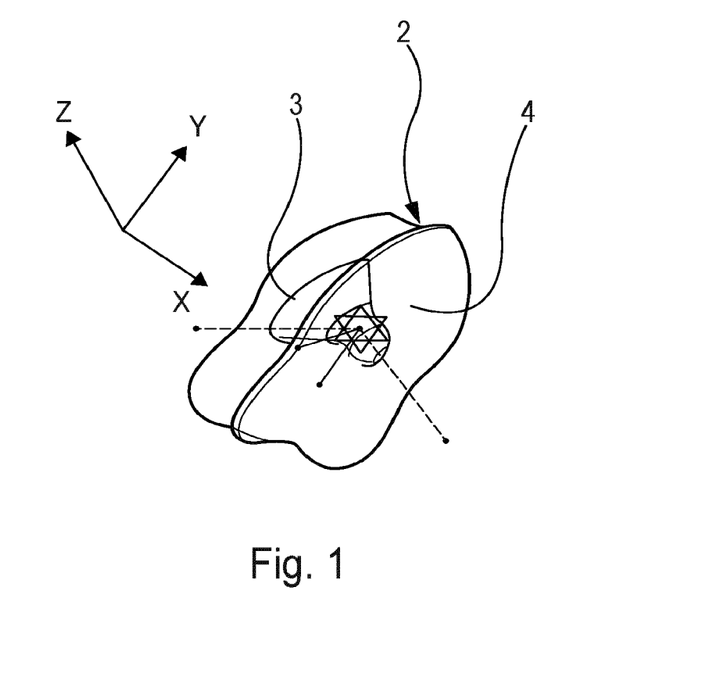
FIG. 1 schematically shows a perspective view of a lighting module according to one embodiment of the invention.
Figure 2:
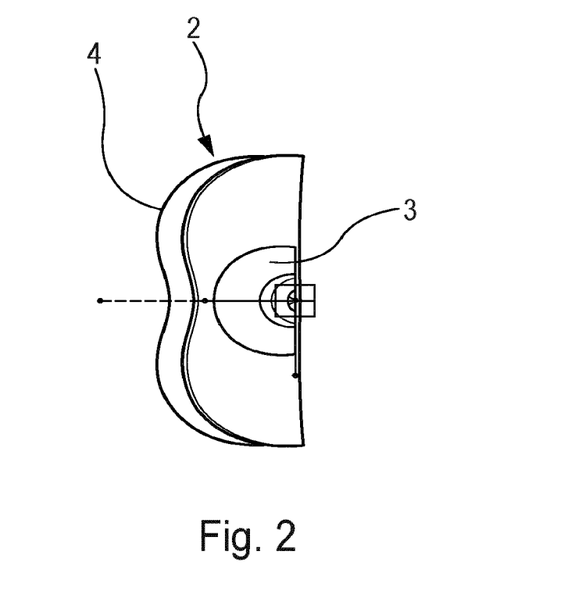
FIG. 2 schematically shows a perspective bottom view of a lighting module according to the embodiment of the invention.
Figure 3:
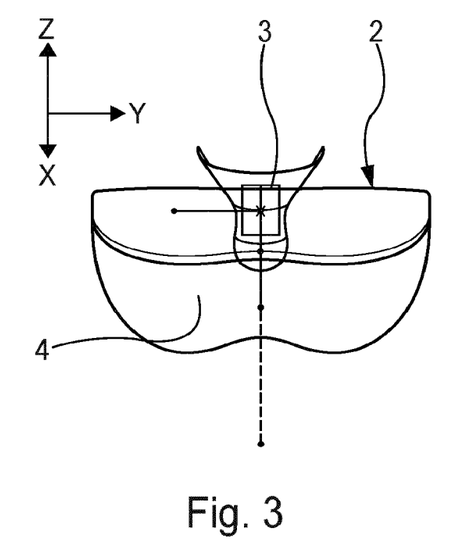
FIG. 3 schematically shows a perspective front view of a lighting module according to the embodiment of the invention.
Figure 4:
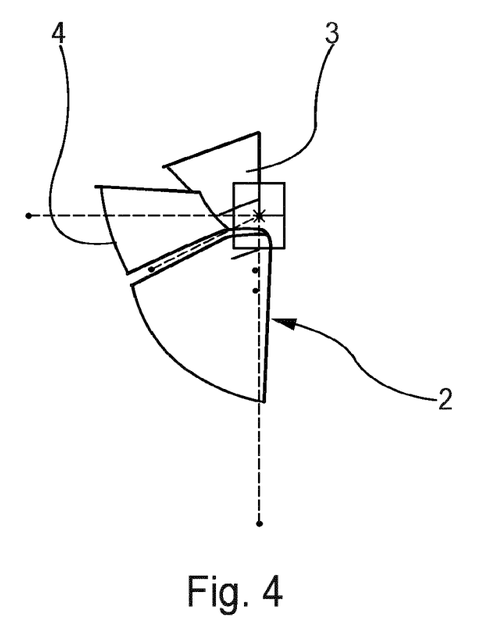
FIG. 4 schematically shows a perspective side view of a lighting module according to the embodiment of the invention.

FIGS. 1 to 4 illustrate multiple views of a lens 2 of a lighting module 1 according to one embodiment of the invention. As is shown in FIG. 1, the lens 2 has a three-dimensional shape generally resembling a peanut. It extends lengthwise in a longitudinal direction y, intended to coincide with the longitudinal direction of a vehicle on which it would be mounted. It extends heightwise in a vertical direction z, intended to coincide with the vertical direction of a vehicle on which it would be mounted. Lastly, it comprises a third, transverse direction x, perpendicular to the previous two directions. The lens 2 has a shape substantially symmetrical with respect to a vertical transverse plane xz, which will be referred to as vertical median plane P, more particularly shown in FIG. 5.

The lens 2 comprises an entry diopter 3 and an exit diopter 4. The lighting module 1 according to the embodiment moreover comprises at least one light source 5, arranged so as to emit light toward the entry diopter 3 of the lens 2. The exit diopter 4 then orients these light rays outward, so as to illuminate the targeted area. According to the embodiment, the entry diopter 3 and the exit diopter 4 comprise specific shapes, which will be specified with reference to FIGS. 5 and 6, that are designed to make it possible to effectively illuminate the lateral area of a motor vehicle, close to a motor vehicle, with a view to achieving the targeted area of illumination recalled above.

In addition, the lens 2 is designed so as to allow the production of a compact lighting module. By way of example, the distance separating the light source 5 from the entry diopter 3 may be smaller than or equal to 10 mm, or even smaller than or equal to 3 mm. Preferably, the light source 5 is contiguous to the entry diopter 3. As an alternative, the entry diopter 3 may form a cavity that at least partially accommodates the light source 5. Additionally, the lens has an overall length (along the y axis) of less than or equal to 50 mm, preferably between 24 and 45 mm, an overall width (along the x axis) of less than or equal to 15 mm, preferably between 10 and 15 mm, and an overall height (along the z axis) of less than or equal to 20 mm, preferably between 5 and 15 mm. The lens preferably exhibits a single part. It is in one piece. It may in particular be made of a plastics material.

The light source 5 may comprise a light emitting diode. To simplify the description, only a single light source will be considered to be present below, even though in practice said light source could be formed by combining multiple separate light sources. This light source can emit any light, for example white and/or near infrared light.

Figure 5:
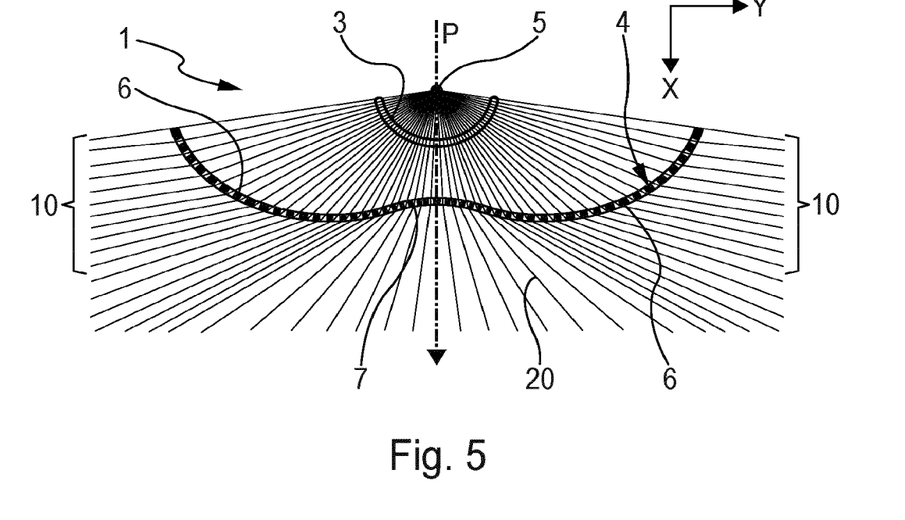
FIG. 5 shows a schematic view, in section through a horizontal plane, of the lighting module according to the embodiment of the invention.

FIG. 5 schematically illustrates the lighting module 1 according to the embodiment in section through a horizontal plane xy, substantially half-way up the lens 2. This section illustrates the light source 5, centered relative to the entry diopter 3, the horizontal section of which has a substantially circular shape, understood to mean in the form of a portion of a circle, which is convex (when considered from the side opposite the light source 5). The light rays 20 coming from the light source 5 are thus not substantially deflected by the entry diopter 3 in this horizontal plane. The exit diopter 4 has a substantially W-shaped horizontal section, having two convex portions 6 separated by a concave portion 7 (this convexity being considered from the side opposite the light source 5). This shape is substantially symmetrical relative to the vertical median plane P. The three convex 6 and concave 7 portions each constitute substantially a portion of a circle. As a variant, they could be formed by one or more linear portions, forming angles between one another.

Advantageously, all the horizontal sections of the two diopters 3, 4 of the lens 2 will have the same features, as described above, over the entire height (in the vertical direction z) of the lens 2. As a variant, only part of these sections, preferably extending over at least half the height of the lens 2, or even over at least three quarters of the height of the lens 2, will have these features.

The lighting module is intended for mounting on a lateral part of a motor vehicle, in particular in an advantageous orientation causing the reference system x, y, z of the lens 2, defined above, to coincide with the transverse, longitudinal, and vertical directions, respectively, of a motor vehicle, as was mentioned above. For the remainder of the description, this particular orientation of the lens 2 will be considered in relation to a vehicle on which it is mounted. In the event of mounting the lighting module 1 on a lateral flank of a vehicle, the light source 5 is intended for positioning on the side of a vehicle, whereas the exit diopter 4 is located toward the outside of the vehicle, so as to transmit light rays over the area to be illuminated.

The specific shape of the exit diopter 4 in a horizontal plane allows good distribution to the right and left of the light rays leaving the exit diopter 4, i.e. good distribution of the illumination in the longitudinal direction y of a motor vehicle. Specifically, FIG. 5 illustrates a multitude of light rays 20 coming from the lens 2. It appears that these rays are distributed over a large area. At the ends of the exit diopter 4, the light rays have a relatively small angle with respect to the longitudinal direction y, this allowing them to illuminate the rear and front parts close to a vehicle, in the lateral area of a vehicle.

Additionally, it appears that the exit diopter 4 behaves similarly to an assembly of two diopters arranged on either side of the vertical median plane P. Specifically, maximum illumination is concentrated in two areas 10, which ultimately correspond to two optical axes of the lens 2. These maximum illumination areas 10 (or optical axes) are arranged at orientations of substantially 80 degrees in relation to the transverse direction x, more generally between 50 and 85 degrees. This geometry makes it possible to substantially uniformly distribute the illumination toward the front and the rear of a vehicle, whilst still achieving satisfactory illumination over an entire lateral area of the vehicle, without a dark area.

Figure 6:
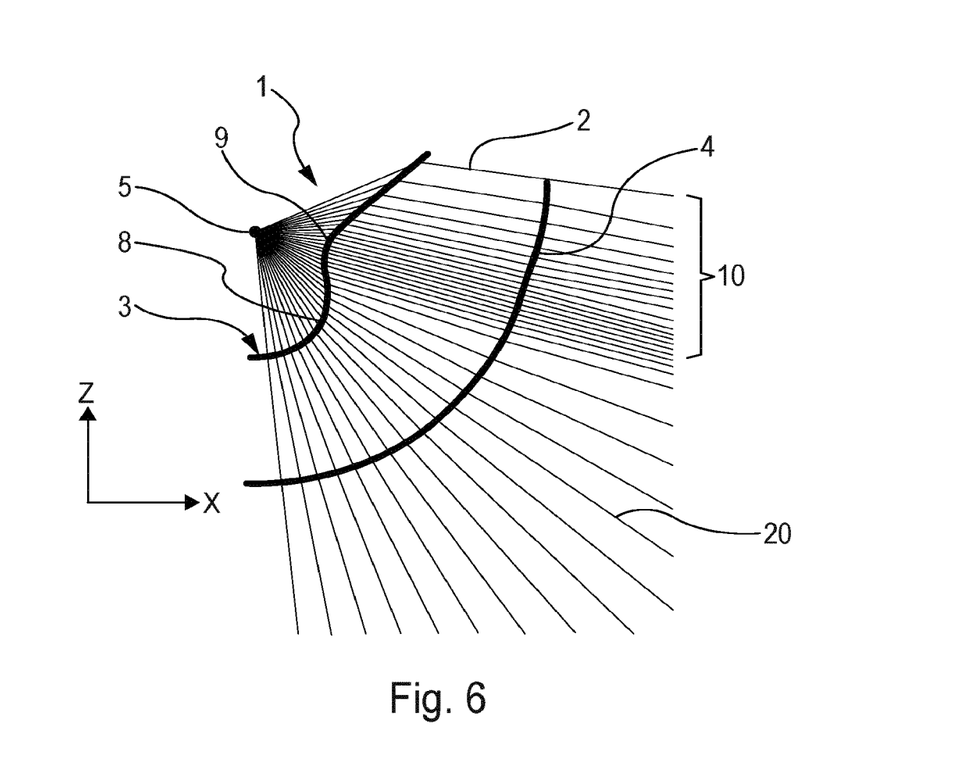
FIG. 6 shows a schematic view, in section through a vertical median plane, of the lighting module according to the embodiment of the invention.

FIG. 6 schematically illustrates the lighting module 1 according to the embodiment in section through the above-mentioned vertical median plane P xz. This section illustrates that the entry diopter 3 has a vertical section with a specific shape, comprising a convex lower portion 8 and a concave upper portion 9. These two portions are rounded. They are in the form of substantially circular portions, that is to say in the form of portions of a circle. The vertical section of the exit diopter 4 has a convex shape. This shape is substantially circular, centered on the light source 5. The exit diopter 4 can deflect the light rays in the vertical plane.

Advantageously, all the vertical sections of the two diopters 3, 4 of the lens 2 will have the same features, as described above, through any vertical plane comprising the light source 5. It should be noted that the three-dimensional surface of the entry diopter 3 is preferably obtained by rotation about a vertical axis comprising the light source 5. This rotation may reach over approximately 180 degrees, the ends being located in a vertical longitudinal plane comprising the light source 5. In addition, all these vertical sections of the exit diopter 4 advantageously have a similar shape, of variable radius, so as to form the variations shown in FIG. 5. As a variant, only a part of these sections will have these features.

The specific shape of the entry diopter 3 in a vertical plane as shown allows a downward overall orientation of the light rays 20 coming from the light source. Firstly, it transmits almost vertical light rays, in the immediate vicinity of the vehicle, via the convex portion 8 mentioned above. The highest light rays are bent downward, so as not to dazzle an adjacent vehicle. The maximum illumination area 10, that is to say the optical axis of the lens, formed by the concave portion 9, has an inclination under a horizontal plane calculated to achieve illumination at a lateral distance of a few meters, adapted to the targeted lateral area. This inclination is preferably between 5 and 20 degrees.

In addition, the upper surface of the lens 2, that is to say the upper surface joining the entry diopter 3 to the exit diopter 4, in a vertical plane, advantageously has a reflective surface, so as to reflect the light rays downward, inside the lens 2, and prevent them from coming out of the lens 2 in a direction that could be detrimental. This upper surface may be substantially planar. It may be a mirror, separate from the lens 2, positioned in the upper part of the lens.

Thus, by way of the specific geometry of the lens 2, the lighting module 1 makes it possible to achieve optimum illumination in all directions, with a single compact lens. The lighting module is thus perfectly designed for its arrangement on a lateral part of a vehicle.

Figure 7:
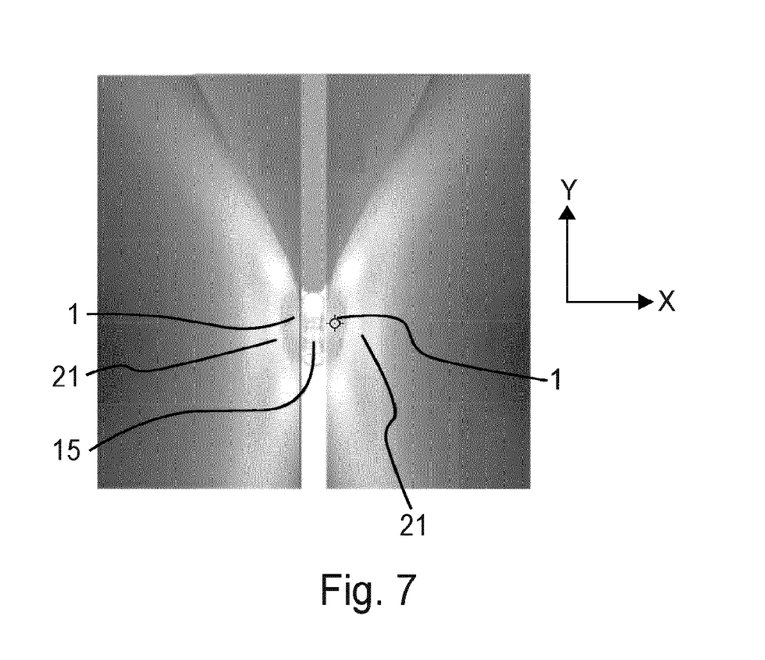
FIG. 7 shows a top view of a vehicle equipped with lighting modules according to the embodiment of the invention.

FIG. 7 thus illustrates a motor vehicle 100 incorporating two lighting modules 1 according to the embodiment of the invention, one on each side. In one embodiment, a lighting module 1 is incorporated into the wall of a rear-view mirror of the vehicle. Such a lighting module 1 may be positioned such that its longitudinal direction coincides with the longitudinal direction of the motor vehicle, as mentioned above. As a variant, the vehicle could comprise multiple lighting modules 1 on each side, for example two or three. By this arrangement, the lighting modules 1 make it possible to form an illuminated lateral area 21 as desired, that is to say an area sufficient for satisfactory illumination of the lateral area of a motor vehicle, compatible with autonomous driving of such a vehicle. These lighting modules are therefore designed to cooperate with at least one camera arranged on a motor vehicle, making it possible to view said illuminated lateral area 21.

Naturally, as a variant, the lighting modules 1 according to the invention could be arranged differently on the side of a motor vehicle. They could be arranged between the two wheels of the vehicle, at any level of the body of the vehicle. Moreover, as a variant, the lighting module may be slightly inclined relative to the motor vehicle, that is to say that their respective reference systems x, y, z mentioned above would no longer be superimposed. In particular, this inclination may be realized relative to the longitudinal axis y, so as to more or less bend the light rays toward the ground. As a variant or in addition, this inclination may be realized relative to the vertical axis z, over an angle of between 1 and 45 degrees, preferably around 20 degrees, so as to more or less orient the light rays toward the front or the rear of the vehicle.

Additionally, according to an advantageous embodiment, a camera may be arranged in the immediate vicinity of a lighting module according to the invention.

Naturally, the invention is not limited to the embodiment described. In particular, the lighting module 1 may comprise a lens 2 with a geometry which differs from that shown according to the embodiment. In all cases, at least one horizontal section of its exit diopter 4 has a double convexity, separated by a concavity, and at least the section through the vertical median plane of its entry diopter 3 comprises a convex lower portion, continued upwardly by a concave portion. In all cases, the concave and convex shapes may take other shapes than those shown, and/or have different radii of curvature. However, it is advantageous for all or some of these portions to have a substantially rounded shape, for example in the form of portions of a circle. As a variant, some of these portions could comprise planar parts, it also being possible for the diopter(s) to comprise angular parts. For example, the horizontal section with double convexity of the exit diopter 4 may have a boundary forming an acute angle or having a small radius of curvature at the concave intermediate portion.

In addition, the surface of the exit diopter 4 extends in a rounded manner, advantageously in the form of a portion of a circle in a vertical plane, as far as its lowest point, substantially positioned under the light source 5. Thus, it extends downward as far as an end substantially positioned in a longitudinal vertical plane passing through the light source. This geometry allows the lens to bend light rays coming from the light source 5 onto the ground in the immediate vicinity of the vehicle. In addition, this active surface of the exit diopter 4 also continues on the sides, that is to say in a horizontal plane, as far as one or two ends substantially positioned in a longitudinal vertical plane passing through the light source, so as to allow the exit diopter 4 to transmit light rays as close as possible to the motor vehicle, in the longitudinal direction forward and/or rearward. Thus, the three-dimensional surface of the exit diopter 4 ultimately has two convex portions separated by a concave portion. Said two convex portions may constitute substantially a portion of a sphere.

Additionally, the lens 2 has been described according to one embodiment as having a symmetrical shape with respect to a vertical median plane. As a variant, this shape could have no plane of symmetry. The vertical median plane will remain defined as the vertical transverse plane positioned substantially halfway along the length (in the longitudinal direction) of the lens 2.

Figure 8:
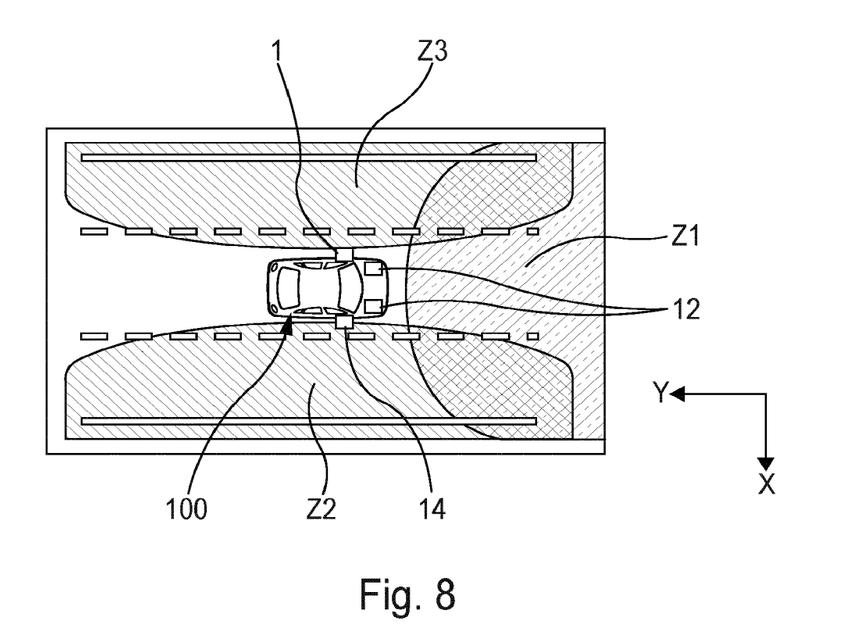
FIG. 8 schematically shows a top view of a motor vehicle according to one embodiment of the invention.

FIG. 8 illustrates in more detail the lighting module 1 intended to be positioned to the right of the vehicle 100. An identical, similar or symmetrical lighting module could be used for the left-hand side of the vehicle 100. The lighting module 1 is incorporated into a lateral rear-view mirror 14 of the vehicle 100. In addition to the lighting module 1, the lateral rear-view mirror 14 comprises a casing 15 and an observation mirror (not shown) making it possible to observe the surroundings at the rear of the vehicle 100. The casing 15 may form a shell extending in front of the observation mirror and support this observation mirror. The lighting module is positioned vertically under the casing 15, in particular under the observation mirror. As a variant, the lateral rear-view mirror may be an e-mirror comprising at least one camera, replacing the observation mirror. The lighting module may be fixed to the casing, itself fixed to the vehicle 100 (for example to a wing or to a door of the vehicle 100) via a support 6. The length of the casing (along the longitudinal axis y) may be greater than or equal to the length of the lighting module along this same axis. Similarly, the width of the casing (along the transverse axis x) may be greater than or equal to the width of the lighting module along this same axis. Thus, the lighting module 1 may be discreetly integrated under the casing and does not project longitudinally or transversely beyond it.

As a variant, the lighting module 1 could be separate from the lateral rear-view mirror. It could for example be arranged in the lower and lateral part of the vehicle 100 or at or close to the lateral rear-view mirror. It could be arranged between the two wheels of the vehicle 100, at any level of the body of the vehicle 100.

The lighting module 1 comprises a light source 5 and a lens 18 arranged around the light source 5. The lighting module further comprises a first screen 111, a second screen 112 and a third screen 113. These three screens are arranged around the lens 18 and are separate from it. The light source 5 may be positioned substantially equidistantly from the first screen and the second screen. As will be seen in the below text, the light module could also not have the third screen 113.

The light source 5 may comprise a light emitting diode. To simplify the description, only a single light source will be considered to be present below, even though in practice said light source could be formed by combining multiple separate light sources. This light source can emit any light, for example white and/or near infrared light.

The first screen is positioned on a first side of the light source 5. In particular, the first screen 111 extends substantially vertically, in front of the light source and at the height of the light source. The bottom of the first screen may extend horizontally and be roughly at the same height as the bottom of the lens 18 or slightly lower than the bottom of the lens 18. For example, the bottom of the first screen may be a few centimeters or a few millimeters lower than the bottom of the lens 18. The first screen may be positioned such that rays emerging from the lens 18 horizontally and toward the front are blocked or reflected by the first screen 111. More specifically, by adjusting the position of the bottom of the first screen and the distance between the first screen and the lens, it is possible to define the value of an angle of incidence A1 (shown in FIG. 10) below which light rays coming from the lens 18 are blocked or reflected by the first screen. The first screen therefore acts as a screen protecting motorists positioned in front of the vehicle 100 from being dazzled by the light source 5.

The second screen 112 is positioned on a second side of the light source 5, opposite the first screen 111 with respect to the light source 5. As before, the second screen 112 extends substantially vertically, behind the light source and at the height of the light source. The bottom of the second screen may extend horizontally and be roughly at the same height as the bottom of the first screen. The bottom of the second screen may likewise be a few centimeters or a few millimeters lower than the bottom of the lens 18. The second screen may be positioned such that rays emerging from the lens 18 horizontally and toward the rear are blocked or reflected by the second screen 112. More specifically, by adjusting the position of the bottom of the second screen and the distance between the second screen and the lens, it is possible to define the value of an angle of incidence A2 below which light rays coming from the lens 18 are blocked or reflected by the second screen. The second screen therefore acts as a screen protecting motorists positioned behind the vehicle 100 from being dazzled by the light source 5.

The third screen extends between the first screen 111 and the second screen 112. It extends substantially horizontally above the light source 5, or with a slight downward inclination at an angle of between 5 and 10 degrees relative to a horizontal plane. The three screens therefore substantially form three adjacent sides of a box, or cap, which covers the light source 5 and the lens 18. In addition to performing a specific optical function, which will be described in detail later, the three screens protect the light source and the lens 18 from external attack laterally and from above. As a variant, it would be possible for the third screen not to be present, for example if the lighting module is already protected from above by a part of the motor vehicle 100, and/or if the light source is configured to emit light in general in a half-space oriented downward. The three screens may be delimited by angles embodying a clear separation between the screens, or else by rounded profiles.

Figure 10:
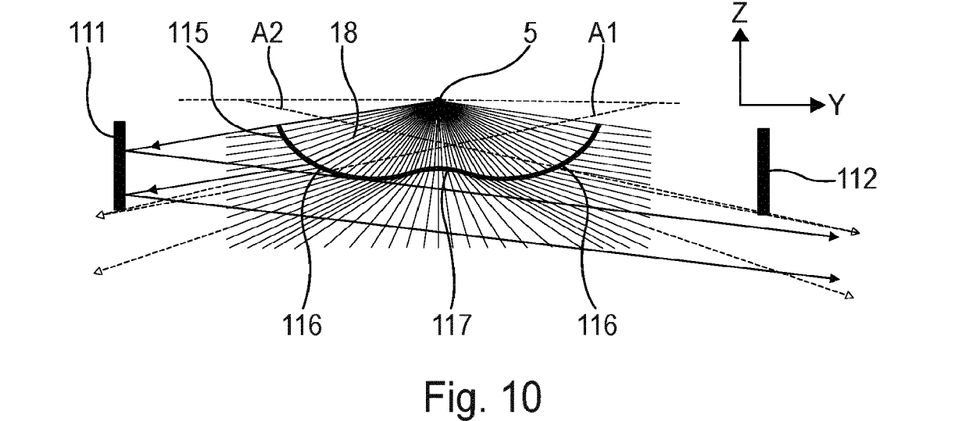
FIG. 10 shows a schematic view, in section through a longitudinal and vertical median plane, of the lighting module.

The first screen extends overall in a first vertical and transverse plane. Similarly, the second screen extends overall in a second vertical and transverse plane. As is shown in FIG. 10, the first screen 111 and the second screen may therefore be substantially parallel to one another. They may be parallel to the vertical axis Z. They could also be inclined with respect to the vertical axis Z so as to favor illumination more or less toward the ground. They could also be inclined with respect to the transverse axis x so as to favor illumination further toward the front or further toward the rear of the vehicle 100.

Figure 9:
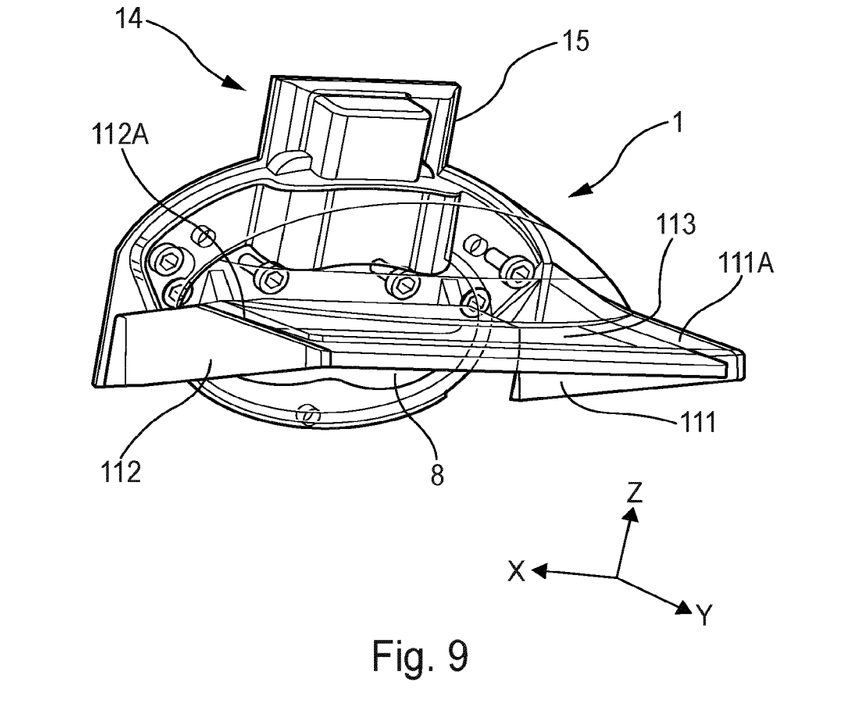
FIG. 9 shows a perspective front view of a lighting module according to one embodiment of the invention.

The first screen and the second screen may have identical or similar shapes. They may have a rectangular overall shape with a long side extending transversely and a short side extending vertically. They may also have a trapezoidal or even triangular overall shape, as shown in FIG. 9. The two parallel sides of the trapezium, forming an upper edge and a lower edge of the screen, may extend substantially horizontally. The first screen and the second screen may comprise an upper edge 111A, 112A, respectively, which is inclined with respect to the transverse axis x. The third screen 113 may extend between these two edges 111A and 112A. The third screen is thus inclined downward from the side of the corresponding vehicle 100.

In general, the bottom of the third screen may be substantially at the same height as the bottom of the first screen and of the second screen. The third screen may thus block or reflect rays emerging horizontally and transversely from the lens 18. Like for the first screen and for the second screen, it is possible to adjust the position of the bottom of the third screen so as to adjust the value of an angle of incidence below which light rays coming from the lens 18 are blocked or reflected by the third screen 113.

The first screen 111 and/or the second screen 112 and/or the third screen 113 may comprise a reflective surface for reflecting light rays coming from the light source. These reflective surfaces are provided on the faces of the respective screens facing the light source 5. When the first screen is fitted with such a reflective surface, the light rays coming from the lens 18 toward the front with an angle of incidence less than the angle of incidence A1 are reflected toward the rear. Similarly, when the second screen is fitted with such a reflective surface, the light rays coming from the lens 18 toward the rear with an angle of incidence less than the angle of incidence A2 are reflected toward the front. Lastly, when the third screen is fitted with such a reflective surface, the light rays coming from the lens 18 toward the right with an angle of incidence less than a given value are deflected downward.

It will therefore be understood that, by adjusting the orientation and the position of the screens, it is possible to modify the angle at which light rays are reflected or deflected by these screens. Advantageously, at least the first two screens are provided with a reflective surface. In this way, all the light rays produced by the light source are advantageously used to illuminate the side of the vehicle 100. When a single screen or only two screens from among the three screens comprise(s) a reflective surface, it is possible to simplify the method for manufacturing the lighting module. The light rays which would reach a screen not provided with a reflective surface can be absorbed and/or diffused by the screen.

Figure 11:
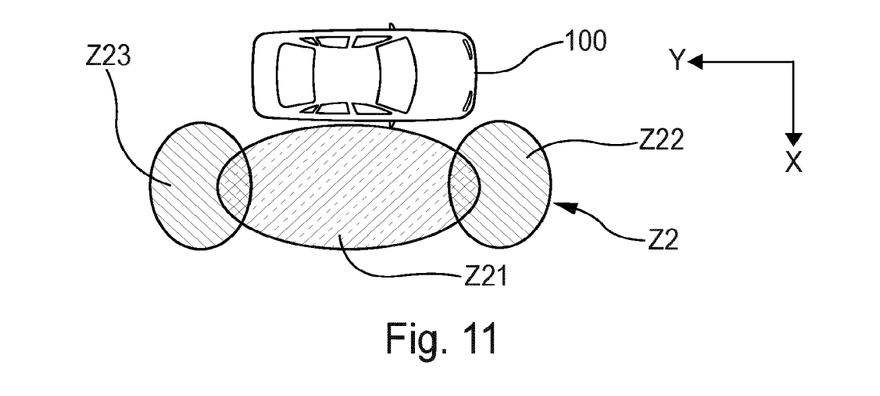
FIG. 11 schematically shows a top view of the motor vehicle and an area of illumination produced by the lighting module.

With reference to FIG. 11, the illumination area Z2 obtained by the lighting module 1 on the right-hand side of the vehicle 100 can be broken down into three parts Z21, Z22, Z23. The first part Z21, positioned substantially at the longitudinal height of the lighting module, is obtained by direct illumination, that is to say without reflection on a reflective surface provided on the first screen or on the second screen. A second part Z22, positioned in front of the first part Z21, is obtained by reflection of the light rays on a reflective surface provided on the second screen 112. A third part Z23, positioned behind the first part, is obtained by reflection of the light rays on a reflective surface provided on the first screen 111.

It should be noted that, depending on the orientation of the reflective surfaces, light rays can be reflected successively by the reflective surface of the first screen and then by the reflective surface of the second screen, and vice versa. However, the intensity of light radiation reflected numerous times can eventually decrease. As a consequence, the intensity of light radiation emerging virtually horizontally from the light module is very low and does not risk dazzling other motorists.

As can be seen in FIG. 11, the first part Z21 and the second part Z22 partially overlap. Similarly, the first part Z21 and the third part Z23 partially overlap. The shape and the position of each part of the illumination area can be adjusted by modifying the position and the shape of the reflective surfaces provided on each of the screens.

Figure 12:
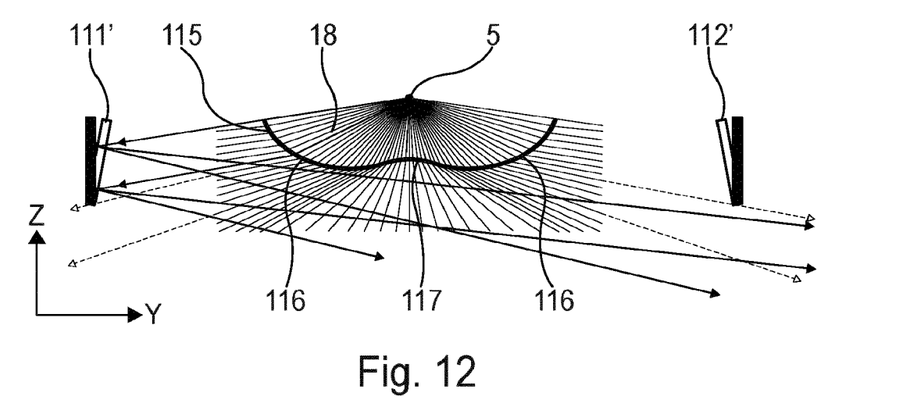
FIG. 12 shows a schematic view, in section through a longitudinal and vertical median plane, of a lighting module according to one variant embodiment of the invention.
Figure 13:
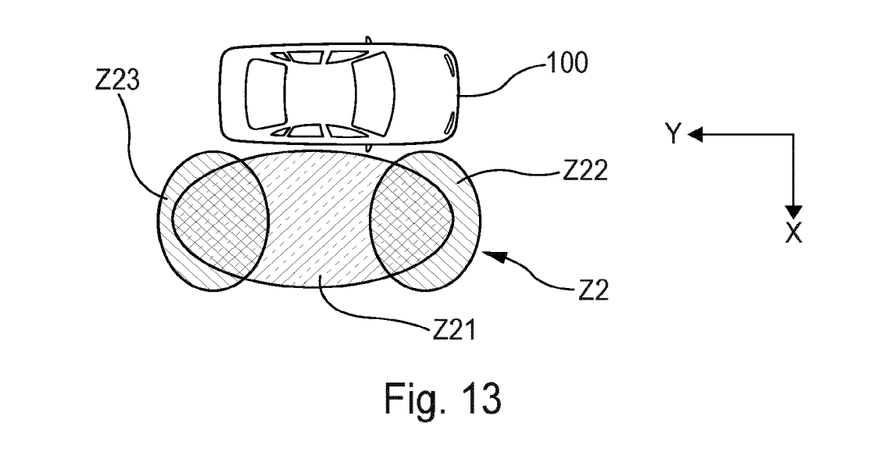
FIG. 13 schematically shows a top view of the motor vehicle and an area of illumination produced by the lighting module according to the variant embodiment.

In particular, FIGS. 12 and 13 illustrate a variant embodiment of the invention in which the two screens 111' and 112' are inclined downward with respect to the vertical direction. The respective vertical sections of the first screen 111' and of the second screen 112' form a non-zero angle with respect to the vertical direction, in particular an angle of between 0 and 50°. The two screens 111', 112' likewise form between them an angle of between 0° and 50°. The screens 111' and 112' are inclined downward, so as to reflect the incident rays at an angle which takes them away from the horizontal. The parts Z21, Z22 and Z23 of the illumination area Z2 are then constricted to a greater extent than described above. The parts Z22 and Z23 are longitudinally closer to the lighting module 3. What is obtained is therefore an illumination area Z2 which is smaller but illuminated with a higher intensity than in the configuration illustrated in FIGS. 10 and 12. One advantage of such an arrangement of the screens 111' and 112' is to minimize the loss of illumination in the parts Z22, Z23 at the ends of the central part Z21 of the illumination area Z2. In addition, the light rays coming from the light source 5 do not risk being subject to multiple reflections before illuminating the road. Optical power losses are therefore minimized.

As a variant and/or in addition to the above, the reflective surface of the first screen and/or of the second screen and/or of the third screen may comprise one or more reliefs. They may for example be of concave or convex shape. They could also comprise multiple (planar or non-planar) faces forming angles between one another. In this way, it is possible to produce illumination areas with a variable area and with a variable distribution of the light intensity within an illumination area. As will be seen in the following text, the shape of the lens may also be adjusted so as to modify the distribution of the light rays.

The first screen and/or the second screen and/or the third screen may be obtained by plastics injection molding. The first screen 111, the second screen 112 and the third screen 113 may form a one-piece assembly, in particular a one-piece assembly obtained by plastics injection molding. Advantageously, the first screen 111, the second screen 112, the third screen 113 and the casing 15 may form a one-piece assembly, in particular obtained by plastics injection molding. In other words, the screens 111, 112 and 113 may be formed directly in the shell of the rear-view mirror. The first screen and the second screen may for example be located in the vertical extension of the front and rear ends of the casing 15. It should be noted that, when the plane in which the first screen 111 extends forms a non-zero angle with the plane in which the second screen 112 extends, the vertical demolding of the part at the end of the injection molding operation is made easier. As a variant, the various screens mentioned above may form separate components, assembled together by any mechanical or other means to secure them to one another.

The reflective surface of the first screen and/or the reflective surface of the second screen and/or the reflective surface of the third screen may be obtained by metal deposition, for example by aluminization. This method has the advantage of being particularly simple to implement and does not result in excess weight of the lighting module. As a variant, the reflective surface(s) could be obtained by adding a mirror in the form of a part respectively added to the first, and/or the second, and/or the third screen.

The lens 18 comprises an entry diopter oriented toward the light source 5, and an exit diopter 115. The entry diopter is the surface of the lens through which the light rays coming from the light source 5 enter the lens. The exit diopter is the surface of the lens through which the light rays coming from the light source 5 leave the lens. The lens 18 may have a three-dimensional shape generally resembling a peanut, the length of which extends parallel to the longitudinal axis y. The lens 18 may have a substantially symmetrical shape with respect to a median vertical transverse plane.

As can be seen in FIGS. 10 and 12, illustrating the lighting module 1 in a section in a vertical and longitudinal plane, the exit diopter 115 comprises at least one section comprising two convex portions 116 separated by a concave portion 117, as seen from a side opposite the light source 5. The convex portions 116 and concave portion 117 may have a rounded shape, in particular in the form of a portion of a circle, and/or a succession of linear portions forming angles between one another. These specific shapes of the entry and the exit diopter are designed to optimally distribute the light rays in the illumination area Z2 whilst still keeping the lens compact.

Advantageously, all the vertical and longitudinal sections of the two diopters of the lens 18 will have the same features, as described above, over their entire width (along the transverse axis x) of the lens 18. As a variant, only part of these sections, preferably extending over at least half the width of the lens 18, or even over at least three quarters of the width of the lens 18, will have these features. It should be noted that the horizontal section of the lens 18, which is not shown, and especially of the exit diopter 15, has a shape similar to its vertical and longitudinal section shown.

By way of example, the distance separating the light source 5 from the entry diopter may be smaller than or equal to 10 mm, or even smaller than or equal to 3 mm. Preferably, the light source 5 is contiguous to the entry diopter 114. As an alternative, the entry diopter 114 may form a cavity that at least partially accommodates the light source 5. Additionally, the lens has an overall length (along the y axis) of less than or equal to 50 mm, preferably between 24 and 45 mm, an overall width (along the x axis) of less than or equal to 15 mm, preferably between 10 and 15 mm, and an overall height (along the z axis) of less than or equal to 20 mm, preferably between 5 and 15 mm. The lens preferably exhibits a single part. It is in one piece. It may in particular be made of a plastics material.

When the light module is operating, the light source emits light rays which pass through the entry diopter, which has a substantially circular section. The light rays are substantially not deflected in the longitudinal and vertical plane. The light rays then pass through the exit diopter 115 and are deflected by virtue of the characteristic shape of this diopter. The light rays which emerge from the exit diopter toward the front with an angle of incidence less than the angle A1 are reflected by the reflective surface of the first screen 111 and illuminate the rear of the illumination area Z2. Similarly, the light rays which emerge from the exit diopter toward the rear with an angle of incidence less than the angle A2 are reflected by the reflective surface of the second screen 112 and illuminate the front of the illumination area Z2. The light rays which do not reach the screens 111 and 112 directly illuminate the central part of the illumination area Z2.

The lighting module makes it possible to obtain homogeneous illumination at a lateral distance of a few meters, suitable for the implementation of driving functions as presented above whilst still retaining a very limited bulk. The presence of the screens 111 and 112 makes it possible to ensure that motorists in front of and behind the vehicle 100 are not dazzled. In other words, the light module is configured such that the light rays coming from the light source cannot directly reach an observer positioned at a height from the ground corresponding to the usual height of a motorist, for example between 1 m and 3 m above ground level. This consideration is based on the assumption of a flat and horizontal ground between the vehicle 100 under consideration and the other motorist. In the rare cases in which a road has significant level differences, the rays coming from the light source could however directly reach a motorist.

The invention also relates to a driving assistance device, comprising at least one such lighting module, in order to illuminate the lateral area of a motor vehicle 100. This assistance device further comprises at least one camera for viewing said illuminated lateral area. It further comprises a central unit, which may be a computer comprising a hardware and/or software device making it possible to exploit the data transmitted by said at least one camera, in order to analyze said data in order to calculate driving assistance data and transmit them to a vehicle. This assistance device thus fulfills the functions of lane keeping, and/or lane centering, and/or lane changing, and/or emergency braking, and/or autonomous emergency steering, and/or parking assistance, and/or autonomous parking, as mentioned at the beginning of the description. In addition, this assistance device may contribute to the automatic control of a vehicle, in particular on the highway, for a function for example known as "highway autopilot".

The invention also relates to a method for assisting with the driving of a motor vehicle, in particular an autonomous vehicle, comprising the following steps:
  illuminating a lateral area of a vehicle using at least one lighting module as described above;
  viewing said illuminated lateral area using at least one camera, and transmitting the data viewed by the camera to a central unit;
  analyzing the data received from the camera by the central unit, in particular detecting obstacles, and deducing driving assistance instructions;
  transmitting driving assistance data to an autonomous driving device and/or to a man-machine interface of the vehicle.

The invention lastly relates to a motor vehicle, preferably an autonomous motor vehicle, comprising one or more lighting modules or an assistance device as described above and arranged in the lateral part of the motor vehicle.

The invention claimed is:

1. A lighting module for a vehicle, wherein the lighting module comprises a light source and a lens comprising an entry diopter oriented toward the light source and an exit diopter, wherein:
  the exit diopter comprises at least one section through a horizontal plane and having a first shape comprising two convex portions separated by a concave portion, when viewed from a side opposite the light source,
  the entry diopter comprises a section through a vertical median plane having a second shape comprising a convex lower portion and a concave upper portion when viewed from a side opposite the light source,
  the first shape is symmetrical about the vertical median plane,
  the light source is configured to project light rays so as to illuminate a lateral area of a vehicle, a first screen positioned on a first side of the light source, a second screen positioned on a second side of the light source, the second side being opposite the first side with respect to the light source, the first screen extending substantially parallel to a vertical and transverse plane, in front of the light source and at the height of the light source, the second screen extending substantially parallel to a vertical and transverse plane, behind the light source and at the height of the light source, the first screen comprising a reflective surface for reflecting light rays coming from the light source toward the second side of said lateral area and/or the second screen comprising a reflective surface for reflecting light rays coming from the light source toward the first side of said lateral area, and
  the lighting module comprises a third screen extending between the first screen and the second screen, the third screen being intended to extend substantially horizontally and above the light source.

2. The lighting module for a vehicle as claimed in claim 1, wherein said first shape comprises two rounded convex portions separated by a concave portion forming an acute angle or having a small radius of curvature, and/or said convex portions and concave portion of said second shape have a rounded shape in the form of a portion of a circle and/or a succession of linear portions.

3. The lighting module for a vehicle as claimed in claim 1, wherein the entry diopter comprises at least one section through a horizontal plane in the form of a portion of a circle centered on the light source.

4. The lighting module for a vehicle as claimed in claim 1, wherein the exit diopter comprises a section through a vertical median plane having a shape in the form of a portion of a circle centered on the light source.

5. The lighting module for a vehicle as claimed in claim 1, wherein the horizontal sections of the exit diopter have the first shape over at least half of the height of the lens.

6. The lighting module for a vehicle as claimed in claim 1, wherein the surface of the exit diopter extends in at least one vertical plane in a rounded manner as far as a lower end substantially positioned in a longitudinal vertical plane passing through the light source, and/or the surface of the exit diopter extends in at least one horizontal plane as far as one or two ends substantially positioned in a longitudinal vertical plane passing through the light source.

7. The lighting module for a vehicle as claimed in claim 1, wherein the lens comprises a reflective upper surface for reflecting the light rays coming from the light source into the lens.

8. The lighting module for a vehicle as claimed in claim 1, wherein the lighting module has a shape distributed symmetrically about a vertical median plane.

9. The lighting module for a vehicle as claimed in claim 1, wherein the lighting module has a length of less than or equal to 50 mm, and/or has a width of less than or equal to 15 mm, and/or has a height of less than or equal to 20 mm.

10. The lighting module as claimed in claim 1, wherein the first screen extends overall in a first plane and in that the second screen extends overall in a second plane, the first plane and the second plane forming a non-zero angle.

11. The lighting module as claimed in claim 1, wherein the first screen and the second screen are obtained by plastics injection molding.

12. The lighting module as claimed in claim 1, wherein at least one of the reflective surface of the first screen and the reflective surface of the second screen is obtained by metal deposition.

13. The lighting module as claimed in claim 12, wherein at least one of the reflective surface of the first screen and the reflective surface of the second screen is obtained by aluminization.

14. The lighting module as claimed in claim 1, wherein at least one of the reflective surface of the first screen and the reflective surface of the second screen comprises one or more reliefs.

15. A lateral rear-view mirror for a motor vehicle comprising a lighting module as claimed in claim 1, the lateral rear-view mirror comprising an observation mirror or a camera so as to allow a driver to view the area behind a motor vehicle, the lighting module being positioned vertically below the observation mirror or below the camera.

16. The lateral rear-view mirror as claimed in claim 15, further comprising a casing supporting the observation mirror, the length of the casing being greater than or equal to the length of the lighting module and/or the width of the casing being greater than or equal to the width of the lighting module.

17. The lateral rear-view mirror as claimed claim 15, further comprising a casing supporting the observation mirror, the casing forming a one-piece assembly with the first screen and/or with the second screen.

18. A driving assistance device comprising at least one lighting module as claimed in claim 1, the driving assistance device comprising at least one camera for viewing said illuminated lateral area, a central unit comprising a hardware and/or software device utilizing the data transmitted by said at least one camera to calculate driving assistance data and transmit them to a vehicle.

19. A motor vehicle comprising one or more lighting modules as claimed in claim 1, arranged in the lower and lateral part of the motor vehicle or at a lateral rear-view mirror of the vehicle.

* * * * *